United States Patent
Kwon

(10) Patent No.: US 10,133,540 B2
(45) Date of Patent: Nov. 20, 2018

(54) VEHICLE SOUND GENERATOR APPARATUS AND METHOD FOR CONTROLLING THE SAME

(71) Applicant: DAESUNG ELECTRIC CO., LTD, Ansan-si, Gyeonggi-do (KR)

(72) Inventor: Dae Woo Kwon, Suwon-si (KR)

(73) Assignee: LS AUTOMOTIVE TECHNOLOGIES CO., LTD., Anyang-si, Gyeonggi-Do (KR)

( * ) Notice: Subject to any disclaimer, the term of this patent is extended or adjusted under 35 U.S.C. 154(b) by 70 days.

(21) Appl. No.: 15/335,521

(22) Filed: Oct. 27, 2016

(65) Prior Publication Data

US 2017/0123754 A1 May 4, 2017

(30) Foreign Application Priority Data

Nov. 3, 2015 (KR) .................. 10-2015-0154017

(51) Int. Cl.
| | | |
|---|---|---|
| G06F 17/00 | (2006.01) | |
| G06F 3/16 | (2006.01) | |
| B60Q 5/00 | (2006.01) | |
| G10K 15/02 | (2006.01) | |
| G05B 15/02 | (2006.01) | |
| G07C 5/02 | (2006.01) | |

(52) U.S. Cl.
CPC .............. *G06F 3/165* (2013.01); *B60Q 5/008* (2013.01); *G05B 15/02* (2013.01); *G07C 5/02* (2013.01); *G10K 15/02* (2013.01)

(58) Field of Classification Search
CPC ........... G05B 15/02; G06F 3/165; G07C 5/02; B60Q 5/008; G10K 15/02

USPC .......................................................... 700/94
See application file for complete search history.

(56) References Cited

U.S. PATENT DOCUMENTS

| | | | | |
|---|---|---|---|---|
| 5,635,903 A | * | 6/1997 | Koike ................... | A63H 17/34 340/384.1 |
| 8,712,615 B2 | * | 4/2014 | Omote ................... | G10K 15/02 701/22 |
| 2007/0257783 A1 | * | 11/2007 | Matsumoto ............ | B60K 6/445 340/425.5 |

FOREIGN PATENT DOCUMENTS

| | | |
|---|---|---|
| JP | H07-182587 A | 7/1995 |
| JP | 2006-199109 A | 8/2006 |
| JP | 2011-230723 A | 11/2011 |
| JP | 2011-235765 A | 11/2011 |
| JP | 2012-121518 A | 6/2012 |

(Continued)

*Primary Examiner* — Hemant S Patel
(74) *Attorney, Agent, or Firm* — Rabin & Berdo, P.C.

(57) ABSTRACT

The present invention provides a vehicle sound generator apparatus comprising a vehicle state sensing unit, a storage unit comprising a sound source storage unit and a reference data storage unit, a sound source playback unit, a sound source amplification unit, a sound output unit, and a control unit. The vehicle state sensing unit senses a vehicle speed, and the control unit calculates a corresponding shifting factor from the velocity shifting profile to correspond to the vehicle speed, and controls and outputs the sound pressure or the pitch of the operating sound. The present invention generate and control a virtual operating sound, which reflects a change in vehicle speed and time to generate a virtual sound that imitates a real internal combustion engine sound while increasing recognizability of a pedestrian so that the vehicle operating sound can be transferred to the driver and pedestrian to further secure safety of the pedestrian.

8 Claims, 9 Drawing Sheets

(56) References Cited

FOREIGN PATENT DOCUMENTS

| | | |
|---|---|---|
| JP | 2013-205478 A | 10/2013 |
| JP | WO2014/061084 A1 | 4/2014 |
| KR | 10-2009-0116320 A | 11/2009 |
| KR | 10-2011-0060504 A | 6/2011 |
| KR | 10-1535013 B1 | 7/2015 |
| KR | 10-1547938 B1 | 8/2015 |

* cited by examiner

VEHICLE SOUND GENERATOR APPARATUS AND METHOD FOR CONTROLLING THE SAME

CROSS-REFERENCE TO RELATED APPLICATIONS

This application claims the benefit of Korean Patent Application No. 10-2015-0154017, filed on Nov. 3, 2015 in the Korean Intellectual Property Office, which is incorporated herein by reference in its entirety.

BACKGROUND OF THE INVENTION

1. Field of the Invention

The present invention relates to a vehicle sound generator apparatus and a control method thereof. More specifically, the present invention relates to an environmentally-friendly vehicle sound generator apparatus and a control method thereof, which generate and control a virtual sound, i.e., an operating sound, which reflects a change in vehicle speed and time to generate a virtual sound that imitates a real internal combustion engine sound while increasing recognizability of a pedestrian so that the vehicle operating sound can be transferred to a driver and the pedestrian to further secure safety of the pedestrian and induce a safe drive of the driver.

2. Description of Related Art

In recent years, due to depletion of energy, the development of an environmentally-friendly vehicle as an alternative transportation means is in increasingly active progress. Examples of representative environmentally-friendly vehicles include hybrid vehicles, electric vehicles, hydrogen fuel cell electric vehicles and the like. Since such an environmentally-friendly vehicle does not adopt a method of operating an engine, it does not generate an engine noise or the like while driving unlike an existing internal combustion engine vehicle. Accordingly, the establishment of regulations on the environmentally-friendly vehicles is being prepared to protect pedestrians around a vehicle, and the research and development of a virtually operating sound generation system of an environmentally-friendly vehicle are required in relation to the establishment of regulations.

That is, an environmentally-friendly vehicle such as a hybrid vehicle, an electric vehicle, a hydrogen fuel cell electric vehicle or the like does not generate an engine's unique sound generated from a gasoline vehicle or a diesel vehicle. For this reason, there occur problems in that an accident may occur since a pedestrian does not recognize a vehicle approaching the pedestrian or a vehicle at a place such as an alley or an indoor parking lot, and in that it is also difficult for a driver to recognize the startup state or the current state of a vehicle since a vehicle noise is not generated.

Furthermore, a vehicle including an energy recharge system, such as an electric vehicle, a hydrogen fuel cell electric vehicle or the like, entails problems in that it is difficult to know whether the recharge is started or finished, and in that it is very inconvenient to use the vehicle due to extreme insufficiency of vehicle information that can be recognized by a driver in relation to a risk caused by discharge of a battery or deficiency of fuel.

In an attempt to solve such problems, apparatuses for generating a virtual engine sound for environmentally-friendly vehicles are recently developed. However, virtual engine sound generation apparatuses that are being currently developed simply generate a sound similar to an engine sound associated with the driving of a vehicle and cannot provide various functions to a pedestrian or a driver, and its technical level is still insignificant since information on the current state of the vehicle is provided insufficiently.

In particular, a conventional apparatus for outputting a sound similar to an engine sound performs a fade-out function of decreasing an output sound when the vehicle travels at a predetermined speed or higher. The fade-out function employs a method of unconditionally blocking the output of the sound simply in proportion to the speed of the vehicle or when a predetermined time period is elapsed after the vehicle speed exceeds the predetermined speed. In addition, such a method involves a problem in that since a virtual warning sound is frequently turned on and off in a traffic jam state in which traveling and stopping of the vehicle is repeated due to a frequent change in speed, i.e., a road traffic congestion, around the speed range of the fade-out function, a pedestrian, a driver or a passenger may suffer from a feeling of displeasure or uneasiness in the traffic jam state.

Besides, since such a conventional technology outputs sound so as to correspond to the speed of the vehicle in a one-to-one manner, it may cause a wide gap between the outputted sound and a real vehicle operating sound.

As an example of the prior art, there has been disclosed Korean Patent Registration No. 10-985767.

SUMMARY OF THE INVENTION

The present invention has been made to solve the above-mentioned problems associated with the prior art, and it is an object of the present invention to provide a vehicle sound generator apparatus and a control method thereof, which can reflect the acceleration and deceleration situation during an actual driving and enables a combination of frequency-specific sounds along with a prompt sound output so that an operating sound closer to a real engine sound can be outputted.

To achieve the above object, in one aspect, the present invention provides a vehicle sound generator apparatus, including: a vehicle state sensing unit for sensing an operation state of a vehicle; a storage unit comprising a sound source storage unit for storing a plurality of operating sounds that can be output according to the operation state of the vehicle in the form of a sound source data, and a reference data storage unit for storing a velocity shifting profile including a shifting factor that controls a sound pressure or a pitch of each of the operating sounds with respect to a speed of the vehicle; a sound source playback unit for selecting at least one of the operating sounds stored in the sound source storage unit, and playing back the selected sound source output from the sound source storage unit; a sound source amplification unit for amplifying the operating sound played back by the sound source playback unit; a sound output unit for outputting the operating sound amplified by the sound source amplification unit; and a control unit for receiving a sensing signal from the vehicle state sensing unit and controlling the operation of the sound source playback unit so as to play back the operating sound in different playback methods in such a manner as to control and change the operating sound according to the received sensing signal, wherein the vehicle state sensing unit senses a vehicle speed, and wherein the control unit calculates a corresponding shifting factor from the velocity shifting profile to correspond to the vehicle speed, and controls and outputs the sound pressure or the pitch of the operating sound.

In the vehicle sound generator apparatus, the velocity shifting profile may include the shifting factor that controls the sound pressure or the pitch of each of the operating sounds with respect to the vehicle speed in such a maner to include a shifting factor of a shifting boundary node for a section boundary speed of a vehicle speed section with the vehicle speed divided by section. The shifting factor within the vehicle speed section may be calculated from a previous shifting node having a shifting factor for the vehicle speed in a previous step on the velocity shifting profile, and a shifting boundary node for any one of anterior and posterior section boundary speeds of a corresponding vehicle speed section.

In another aspect, the present invention provides a method for controlling a vehicle sound generator apparatus, including: a providing step of providing the vehicle sound generator apparatus according to claim 1; a sensing step of sensing a speed of a vehicle; a shifting factor calculation step of calculating a shifting factor corresponding to the vehicle speed from the vehicle speed sensed in the sensing step and a velocity shifting profile stored in a reference data storage unit of a storage unit; and a control and output step of outputting, through a sound output unit, an operating sound obtained by being subjected to the shifting control according to the vehicle speed from the shifting factor calculated in the shifting factor calculation step and the operating sound.

In the vehicle sound generator apparatus control method, the velocity shifting profile may include the shifting factor that controls the sound pressure or the pitch of each of the operating sounds with respect to the vehicle speed in such a manner to include a shifting factor of a shifting boundary node for a section boundary speed of a vehicle speed section with the vehicle speed divided by section, wherein the shifting factor within the vehicle speed section is calculated from a previous shifting node having a shifting factor for the vehicle speed in a previous step on the velocity shifting profile, and a shifting boundary node for any one of anterior and posterior section boundary speeds of a corresponding vehicle speed section. The shifting factor calculation step may include: a speed confirmation step S31 of confirming the vehicle speed sensed in the sensing step; a speed section confirmation step S33 of confirming a corresponding vehicle speed section from the vehicle speed confirmed in the speed confirmation step; a speed section-corresponding shifting node setting step S35 of setting a shifting node for a corresponding vehicle speed from a shifting node corresponding to a previous vehicle speed and a shifting boundary node for a posterior section boundary speed of section boundary speeds of the corresponding vehicle speed section sensed in the speed section confirmation step S33; and a shifting factor calculation step S37 of calculating a corresponding shifting factor from the set shifting node for the corresponding vehicle speed.

In the vehicle sound generator apparatus control method, the speed section-corresponding shifting node setting step S35 may include: a previous shifting node confirmation step S351 of confirming a shifting node for the previous vehicle speed; a section boundary shifting node confirmation step S353 of a shifting boundary node for any one of the section boundary speeds of the corresponding vehicle speed section; and a corresponding vehicle speed shifting node calculation step S355 of calculating a shifting node for a current corresponding vehicle speed from the previous shifting node and the any one section boundary shifting node.

In the vehicle sound generator apparatus control method, the section boundary shifting node confirmation step S353 may include: an acceleration confirmation step S3531 of calculating a current acceleration (at) of the vehicle from a vehicle speed (vt-1) in the previous step and the current vehicle speed (vt); an acceleration and deceleration determination step S3535 of determining whether the current vehicle acceleration (at) is equal to or larger than 0; and a posterior section boundary shifting node setting step S3537 of setting the section boundary shifting node as a shifting node for the posterior section boundary speed of the section boundary speeds of the corresponding vehicle speed section if it is determined that the current vehicle acceleration is equal to or larger than 0 in the acceleration and deceleration determination step S3535.

In the vehicle sound generator apparatus control method, the section boundary shifting node confirmation step S353 may further include: an anterior section boundary shifting node setting step S3539 of setting the section boundary shifting node as a shifting node for the anterior section boundary speed of the section boundary speeds of the corresponding vehicle speed section if it is determined that the current vehicle acceleration is smaller than 0 in the acceleration and deceleration determination step S3535.

In the vehicle sound generator apparatus control method, in the case where the vehicle is an internal combustion engine vehicle, the control unit may control the vehicle sound generator apparatus to be turned ON and compare a signal from an RPM sensor included in a vehicle state sensing unit with a preset value stored in the storage unit to control the on/off operation of the vehicle sound generator apparatus if the vehicle speed is equal to or larger than 0 km/h.

In the vehicle sound generator apparatus control method, in the case where the vehicle is a hybrid vehicle, the control unit may control the vehicle sound generator apparatus to be turned ON if the vehicle speed is equal to or larger than 0 km/h and the vehicle mode is not an internal combustion engine mode.

In the vehicle sound generator apparatus control method, the control unit may control the vehicle sound generator apparatus to be turned off if the vehicle speed is equal to or larger than 0 km/h or the vehicle mode is an internal combustion engine mode. In the case where a transmission mode from an inhibitor sensor included in the vehicle state sensing unit forms the number of a stage higher than that of a preset transmission mode stored in the storage unit, a speed signal from a vehicle speed sensor included in the vehicle state sensing unit is higher than a preset speed stored in the storage unit, and a signal from the RPM sensor included in the vehicle state sensing unit is smaller than the preset value stored in the storage unit, the control unit may determine that the vehicle travels on a downhill slope, and control the vehicle sound generator apparatus to be turned on.

In the vehicle sound generator apparatus control method, the method may further include a correction step S50 of allowing the control unit to compare a sound output signal outputted in the control and output step with a reference sound output signal stored in the storage unit, and control the velocity shifting profile.

In the vehicle sound generator apparatus control method, the velocity shifting profile may include a shifting factor of a shifting boundary node for a section boundary speed of a vehicle speed section with the vehicle speed divided by section. The correction step S50 may include: an output sensing step S51 of sensing the sound output signal outputted in the in the control and output step; an output reference comparison step S53 of comparing the sound output signal obtained in the output sensing step with the reference sound output signal; a conformance determination step S55 of determining whether or not the sound output signal is in conformance with the standard of the reference sound output signal; and a node position control step S57 of controlling, on the velocity shifting profile, the position of the shifting boundary node using a shifting boundary node shift value stored in the storage unit.

The present invention has an advantageous effect in that various operation states of a vehicle are sensed and various kinds of operating sounds are played back according to the sensed vehicle operation states or through variable pitch or mixing in different playback methods so that a further realistic operating sound can be delivered to a driver or a pedestrian according to a vehicle operation state, thereby further securing safety of the pedestrian, and inducing a safe drive of the driver.

In addition, the fade-out function is executed in consideration of a vehicle speed and a time elapsed after the vehicle speed enters a speed over a predetermined speed range so that a feeling of displeasure or uneasiness caused by a frequent change in speed at the time of implementation of the fade-out function can be prevented.

BRIEF DESCRIPTION OF THE DRAWINGS

The above and other objects, features and advantages of the present invention will be apparent from the following detailed description of the preferred embodiments of the invention in conjunction with the accompanying drawings, in which.

DESCRIPTION OF THE PREFERRED EMBODIMENTS

Figure 1:
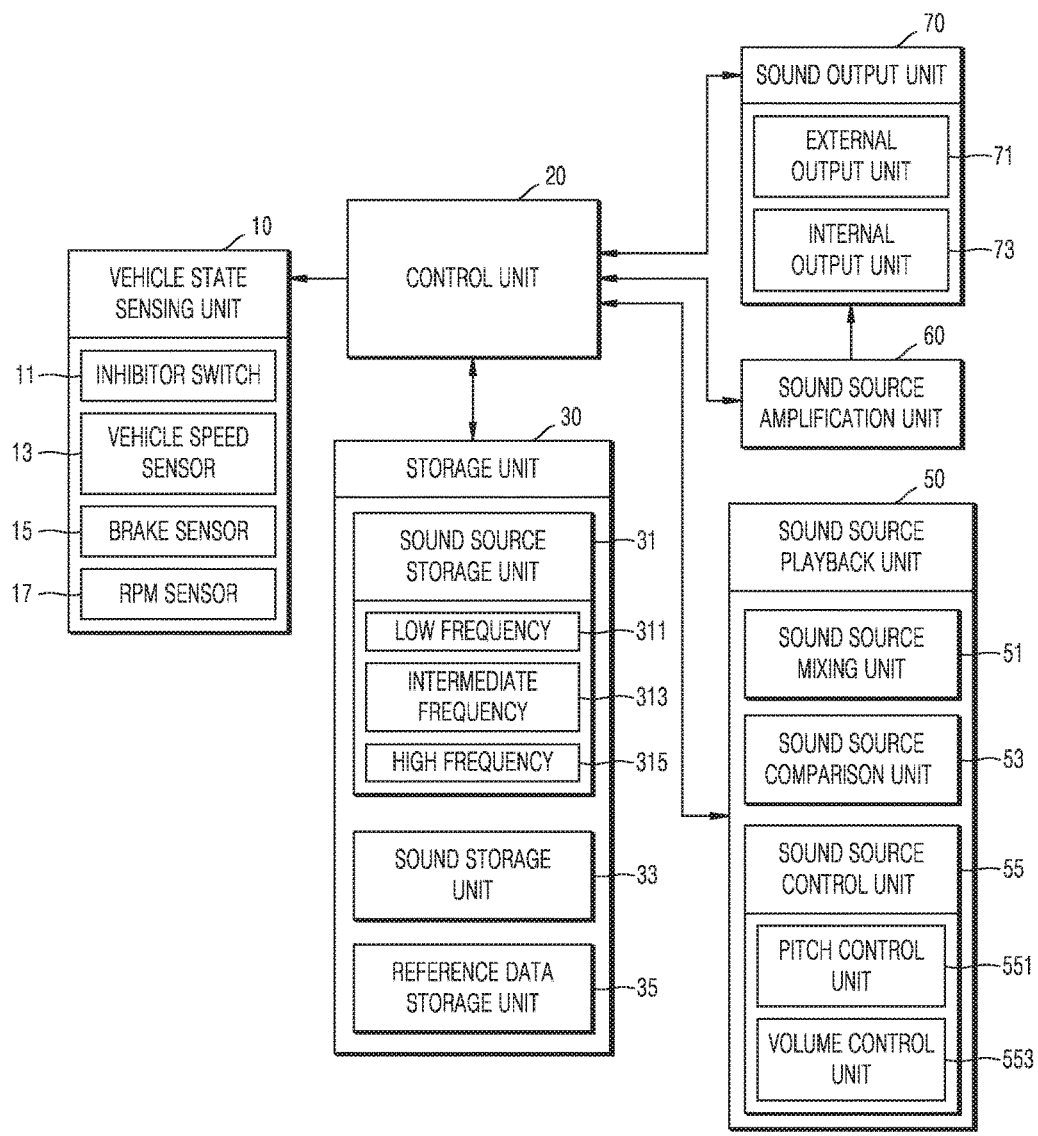
FIG. 1 is a schematic block diagram showing the configuration of a vehicle sound generator apparatus according to an embodiment of the present invention.

Now, preferred embodiments of the present invention will be described hereinafter in detail with reference to the accompanying drawings. It should be noted that the same elements in the drawings are denoted by the same reference numerals although shown in different figures. In the following description, the detailed description on known function and constructions unnecessarily obscuring the subject matter of the present invention will be avoided hereinafter.

An environmentally-friendly vehicle sound generator apparatus according to this embodiment is an apparatus for generating and providing a further realistic and safe virtual operating sound to a driver or a pedestrian by applying various operating sounds or playback methods according to an operation state of a vehicle. The vehicle sound generator apparatus includes a vehicle state sensing unit 10, a storage unit 30 including a sound source storage unit 31 and a reference data storage unit 35, a sound source playback unit 50, a sound source amplification unit 60, a sound output unit 70, and a control unit 20.

The vehicle state sensing unit 10 is configured to sense an operation state of a vehicle. Since various operating sounds can be generated according to the operation state of a vehicle sensed through the vehicle state sensing unit, the vehicle state sensing unit is preferably configured to sense various operation states of the vehicle. For example, the vehicle state sensing unit 10 may include an inhibitor switch 11, a vehicle speed sensor 13, a brake sensor 15, and an RPM sensor 17.

The inhibitor switch 11 serves to sense and output a gear shift range of a vehicle transmission. The vehicle speed sensor 13 senses the driving speed of a vehicle. The brake sensor 15 serves to sense and output the position of a brake pedal to confirm a driver's braking intention through a brake pedal position of the driver. The RPM sensor 17 serves to sense and output an engine rotation speed of the engine. Besides, the vehicle state sensing unit 10 may include a start button 110 of the vehicle, a torque sensor 120 for sensing an output torque of an electric motor which is a power generation means of the vehicle, an acceleration pedal position sensor 140 for sensing and outputting a position of the acceleration pedal to confirm whether or not the driver accelerates the vehicle, a battery sensor 160 for sensing a charged state of power energy of an environmentally-friendly vehicle such as a hybrid car or an electric car, and a charging cable connection sensor for confirming connection to a charging connector when a separate charging connector (not shown) is provided in the vehicle. Besides these elements, the vehicle state sensing unit 10 may be configured to sense various kinds of vehicle operation states, such as an operation ready state of the vehicle, an operation speed of an electric motor, a driving speed of the vehicle and the like. It may be configured to sense each of the operation states through a separate sensor or the like, and the speed, acceleration and the like of the vehicle can be determined through the operation states sensed here, and an operating sound of a form further appropriate to the current operation state can be generated using the sensed operation states.

The storage unit 30 includes the sound source storage unit 31. The sound source storage unit 31 is configured to store various kinds of operating sounds, which can be output according to an operation state of the vehicle, in the form of a sound source data. A sound source stored in the sound source storage unit 31 includes frequency band-specific sound sources. In other words, the sound source storage unit 31 includes a high frequency sound source storage unit 315, an intermediate frequency sound source storage unit 313, and a low frequency sound source storage unit 31. Each of the high frequency sound source storage unit 315, the intermediate frequency sound source storage unit 313, and the low frequency sound source storage unit 311 has stored therein a sound source of a corresponding frequency band. In this case, a low-frequency band is set to a frequency band of about less than 1,000 Hz, an intermediate-frequency band is set to a frequency band ranging from about 1,000 Hz to less than 3,000 Hz, and a high-frequency band is set to a frequency band of about more than 3,000 Hz. The frequency band may be adjusted depending on design specifications.

In addition, although not shown in this embodiment, each of the high frequency sound source storage unit 315, the intermediate frequency sound source storage unit 313, and the low frequency sound source storage unit 311 may have stored therein a sound source of each frequency band according to each driving state. For example, an operating sound such as an engine start sound of a vehicle, i.e., the engine start sound generated when an engine starts, and a driving sound generated when the vehicle drives, particularly, a light acceleration driving sound of an engine generated when the vehicle drives at a low speed of 20 to 30 km/h, a rapid acceleration driving sound generated when the engine abruptly accelerates, and a sudden brake driving sound generated when the vehicle abruptly stops by abrupt operation of the brake may be stored by frequency band in the sound source storage unit 31. In addition, various sound sources may be applied depending on the determination of a brake operation state and a rapid acceleration state that are obtained in the vehicle state sensing unit. In this embodiment, a description will be made hereinafter centering on the case where basic sound source of each frequency band is utilized.

Figure 2:
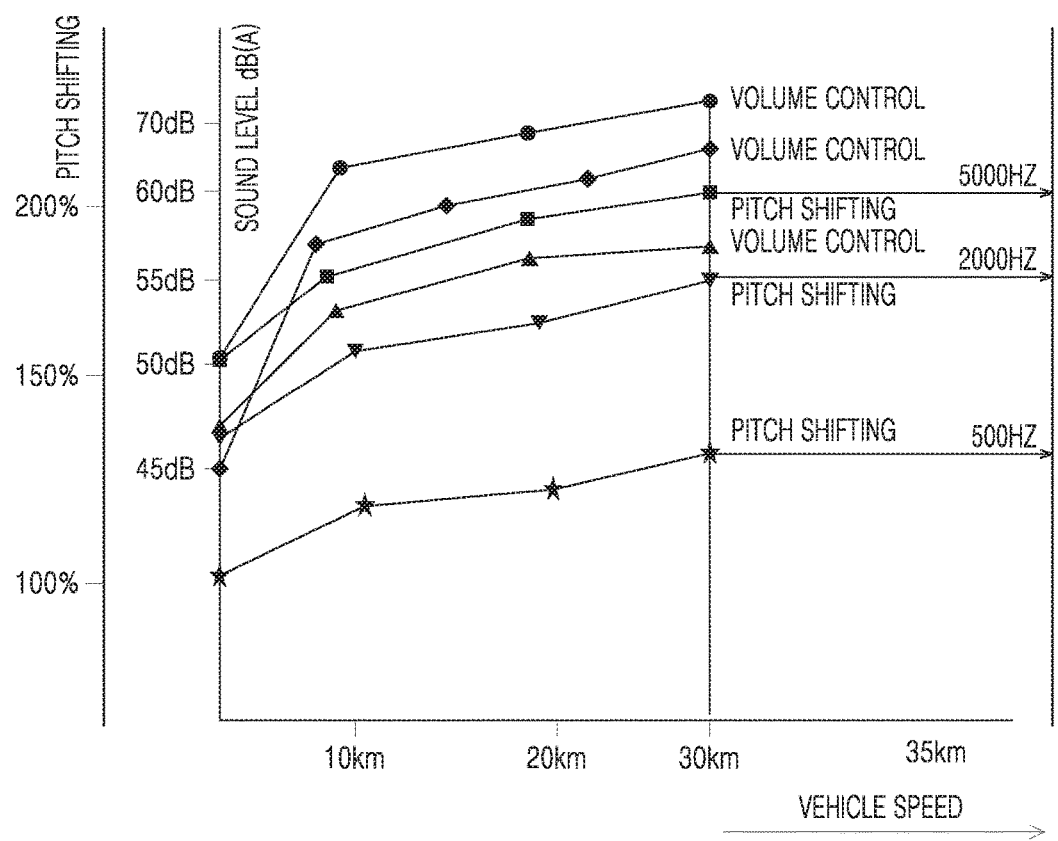
FIG. 2 is a schematic diagram showing an example of a velocity shifting profile used in a vehicle sound generator apparatus according to an embodiment of the present invention.
Figure 3:
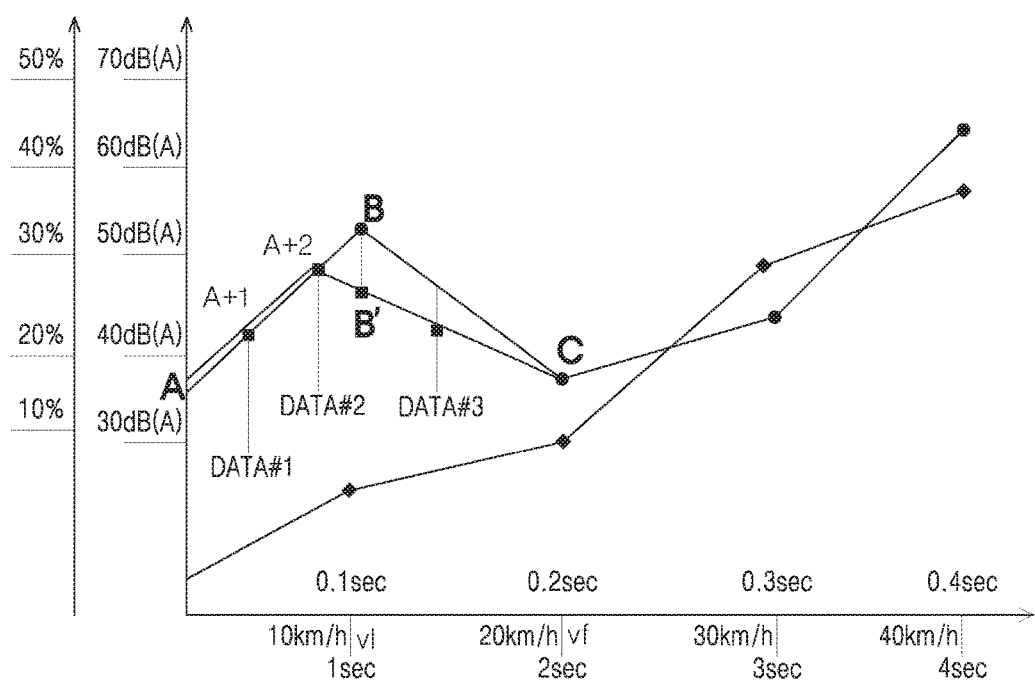
FIG. 3 is a schematic diagram showing a shifting factor calculation process of the pitch shifting for an example of a velocity shifting profile used in a vehicle sound generator apparatus according to an embodiment of the present invention.
Figure 4:
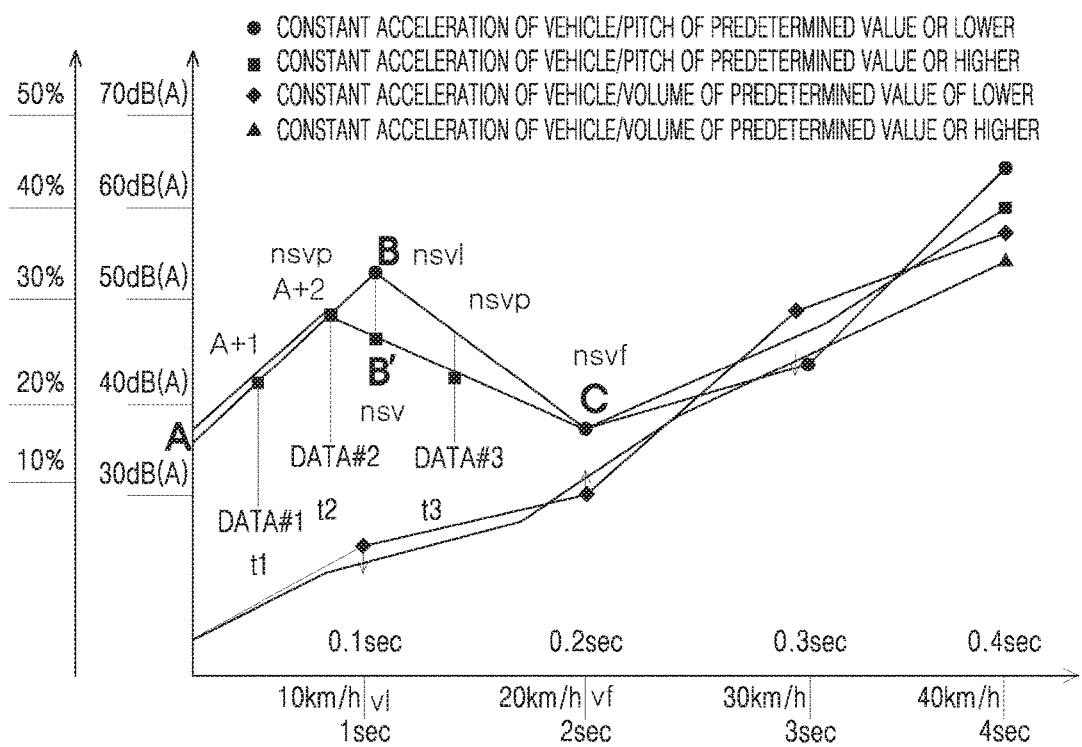
FIG. 4 is a schematic diagram showing a shifting factor calculation process of the pitch shifting and sound pressure shifting for an example of a velocity shifting profile used in a vehicle sound generator apparatus according to an embodiment of the present invention.
Figure 5:
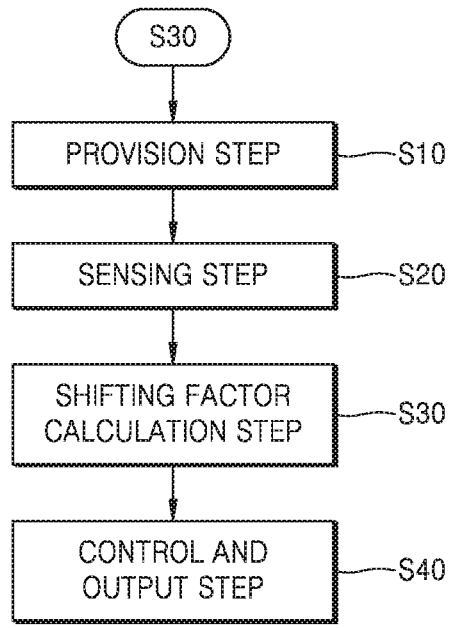
FIGS. 5 to 9 are a flowchart showing a control process of a vehicle sound generator apparatus according to an embodiment of the present invention and an application control example of an internal combustion engine and an environmentally-friendly vehicle.
Figure 6:
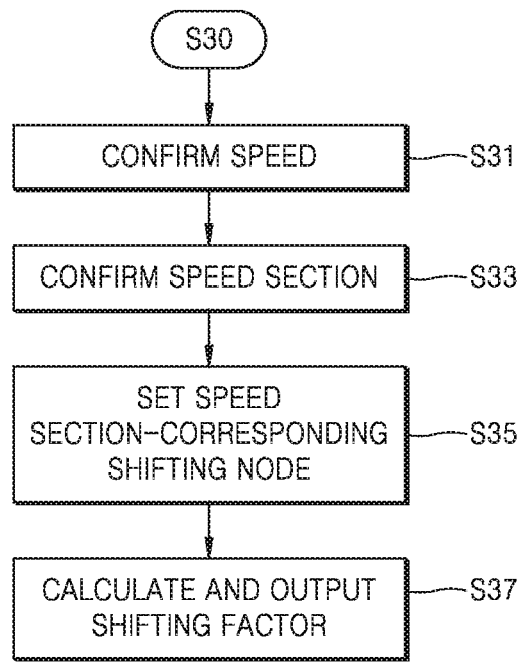
Figure 7:
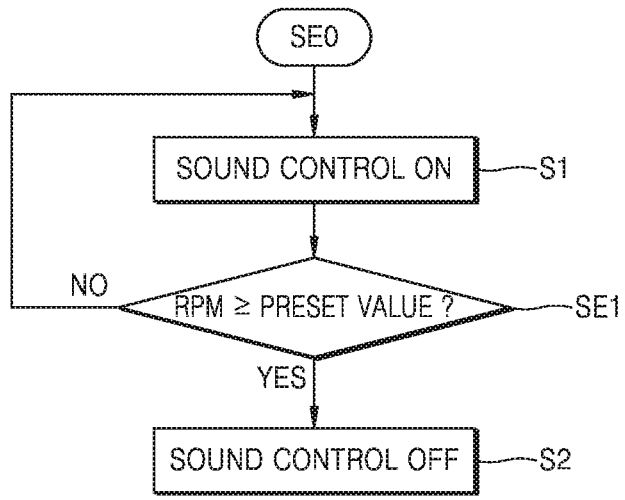
Figure 8:
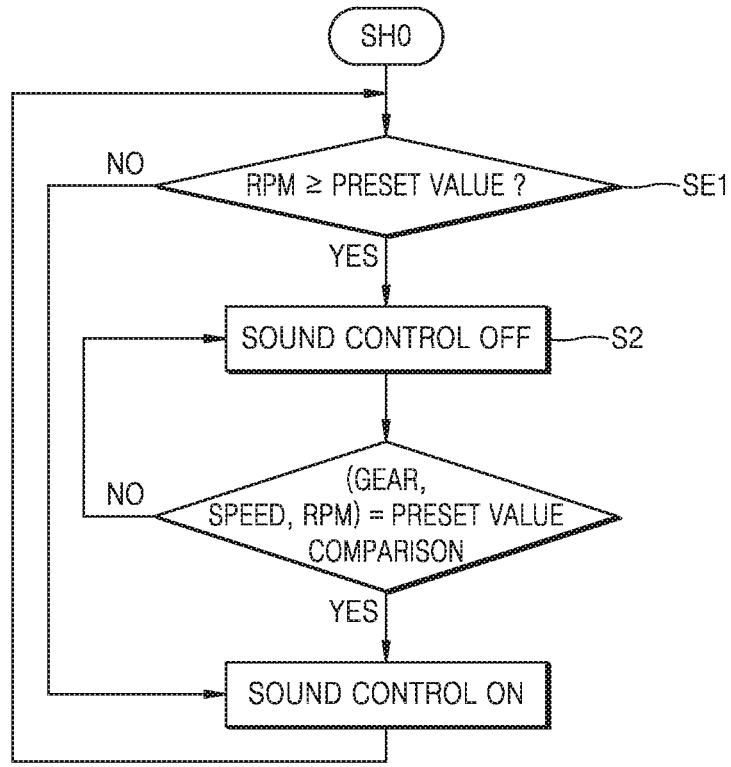
Figure 9:
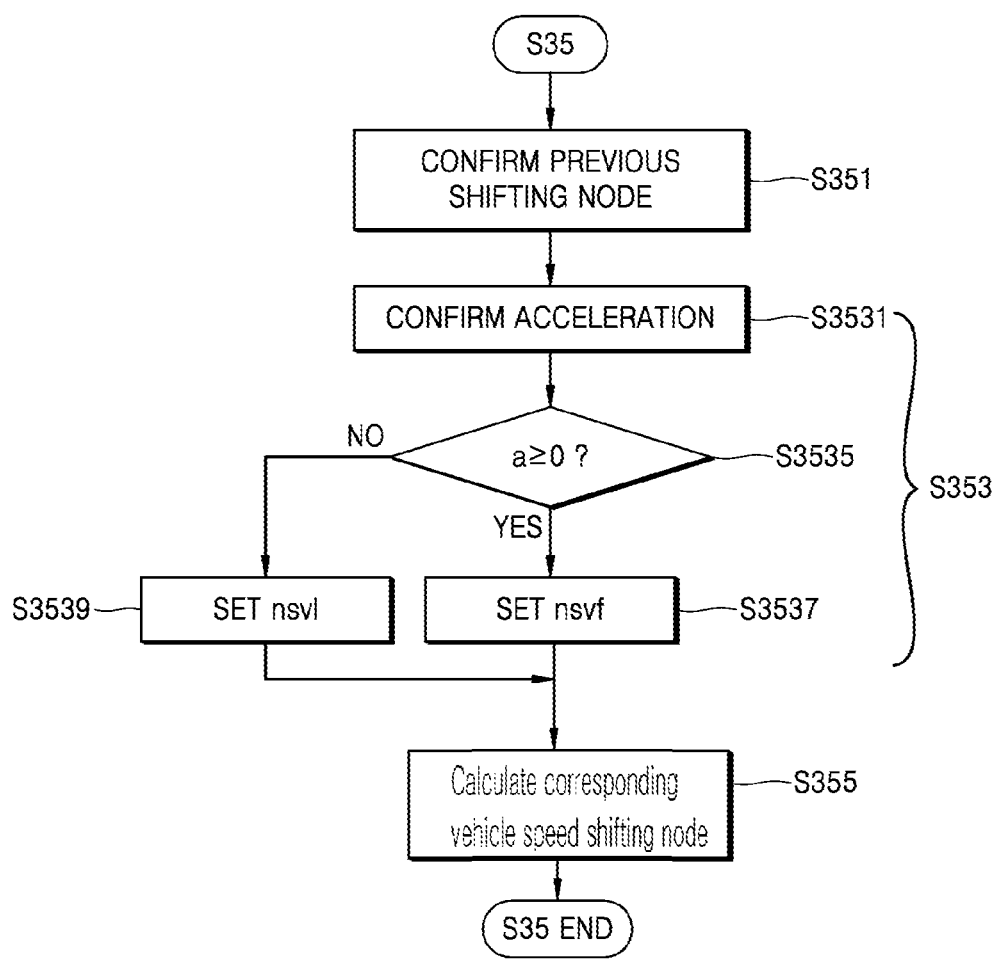
Figure 10:
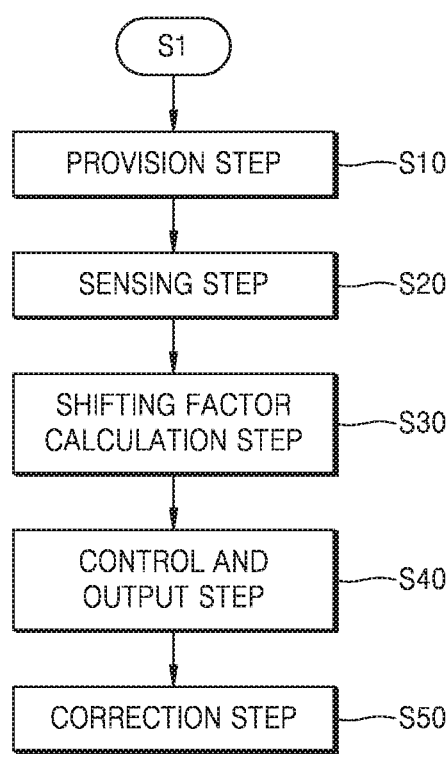
FIGS. 10 and 11 are flowcharts showing a control process of a vehicle sound generator apparatus according to a modification of an embodiment of the present invention.
Figure 11:
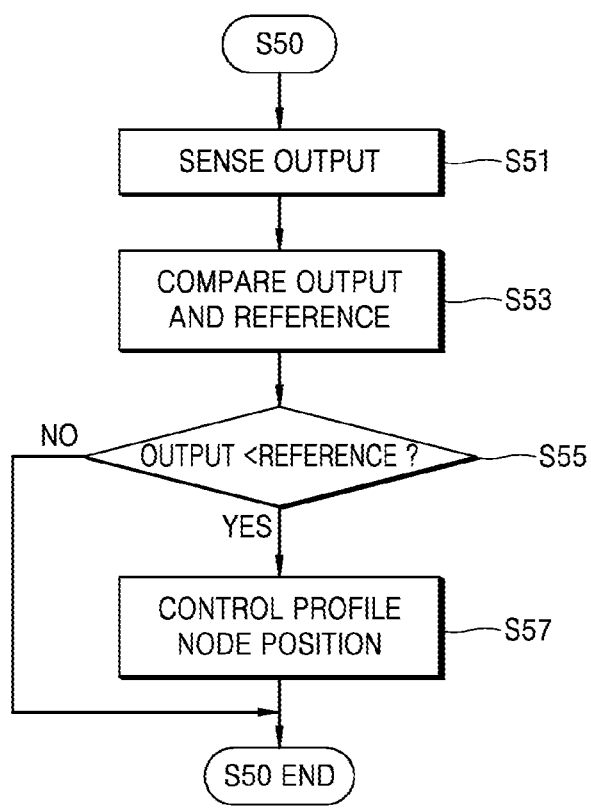

The storage unit 30 of the present invention further includes the reference data storage unit 35. The reference data storage unit 35 includes data of a velocity profile of the present invention. The velocity profile is a map data obtained diagrammatizing a shifting factor for a sound pressure and a pitch shifting according to the speed of a vehicle with respect to a low-frequency sound source, an intermediate-frequency sound source, and a high-frequency sound source according to each frequency band stored in the sound source storage unit 31. An example of the velocity profile is shown in FIG. 2 wherein an X-axis denotes a vehicle speed, and a Y-axis denotes a shifting factor for a sound pressure and/or a pitch. In this case, the shifting factor represents a shifting application value for a basic sound source of each frequency band. The shifting factor can adjust the form of a function previously stored in the basic sound source, i.e., the basic sound source of each frequency band after being signal-processed. For example, the shifting factor may be modified in a various manner, such as applying the values for a sound pressure and a pitch, which are calculated for each vehicle speed, to a sound source of a corresponding frequency band in the form of a convolution or an incremental calculation. In addition, in FIG. 2, the shifting factors for each sound pressure and each pitch is indicated in the unit of dB(A) and %, but may be modified in various manners, such as being applied in the form of a ratio for the shifting for the sound pressure and the pitch or in the unit of a corresponding incremented sound pressure and pitch depending on a preset signal processing method designed.

Further, the velocity profile of the present invention is stored in the form of a map data, but may be stored as data linearized according to a preset speed section to take a method of minimizing a storage space. That is, a point having a value for a shifting factor for the shifting of a sound pressure and a pitch for anterior and posterior speeds of the preset speed section is defined as a shifting boundary node (nsv), and the shifting factor for a speed within a corresponding speed section can be calculated through shifting boundary nodes (nsv) before and after a corresponding speed section or a shifting node for a previous speed and a shifting boundary node (i.e., a low speed-side shifting boundary node) before the corresponding speed section or a shifting boundary node (i.e., a high speed-side shifting boundary node) after the corresponding speed section. The selection of any one shifting boundary node from the shifting boundary node before the corresponding speed section and the shifting boundary node after the corresponding speed section can be determined depending on whether a corresponding vehicle is in an accelerated or decelerated state. In other words, in the case where the vehicle state sensing unit includes an acceleration sensor, an acceleration value of a vehicle is used directly, or in the case where the vehicle state sensing unit includes only a vehicle speed sensor, a current accelerated or decelerated state is confirmed from a vehicle speed of a previous state and a vehicle speed of a current state. Based on this confirmation, if the current state of the vehicle is the accelerated state, a boundary node after the shifting of a corresponding speed section is selected as the shifting boundary node of the corresponding speed section for calculating a shifting factor for the vehicle speed of the current state. If the current state of the vehicle is the decelerated state, a boundary node before the shifting of the corresponding speed section is selected as the shifting boundary node of the corresponding speed section for calculating a shifting factor for the vehicle speed of the current state. Thus, a shifting factor for the shifting of a sound pressure and a pitch for the current vehicle speed can be calculated through an interpolation with the shifting node for the previous state.

In addition, the storage unit 30 of the present invention may further include a sound storage unit 33. The sound storage unit 33 can store, in the form of a sound source data, an acoustic sound such as a recharge start sound expressing a recharge start state of the vehicle, a recharge completion sound expressing a recharge completion state and a separate warning sound such as a recharge warning sound expressing a request of charging cable connection caused by disconnection of the charging cable when recharge is needed, a voice sound formed in a voice guidance message, and the like.

an operation process such as a predetermined interpolation necessary in the process of calculating a shifting factor for controlling the shifting of a pitch or a sound pressure from the velocity shifting profile in order to control the sound source stored in the sound source storage unit 31.

The sound source playback unit 50 is controlled in operation by the control unit 20. The sound source playback unit 50 selects any one of the operating sounds for outputting an engine sound, which are stored in the sound source storage unit 31, and calculates a shifting factor corresponding to the speed of the vehicle to output a sound pressure and a pitch of the sound source through shifting control. The sound source playback unit 50 of the present invention includes a sound source control unit 55, and may include a sound source mixing unit 51 and a sound source comparison unit 53 for the comparison and combination of complex sound sources, if necessary.

The sound source control unit 55 includes a pitch control unit 551 and a sound pressure control unit 553. The pitch control unit 551 and the sound pressure control unit 553 control a sound source of a corresponding frequency band through the control of a pitch shifting or a sound pressure shifting using a shifting factor calculated by the control unit 20 and the arithmetic unit 40 from the velocity shifting profile stored in the reference data storage unit 35 of the storage unit 30. The control of a sound pressure and/or a pitch, which is executed in the sound source playback unit 50, is changed according to an accelerated or decelerated state of the vehicle through a velocity profile, but not a method of outputting a sound source to correspond to the speed of the vehicle in a one-to-one manner. Thus, when an interpolation process is performed to calculate a shifting node of a corresponding speed depending to the accelerated or decelerated state, a variable selection according to the speed of the vehicle is performed in selecting shifting nodes before and after the interpolation so that a change in the vehicle speed, i.e., a change according to acceleration or deceleration can be promptly reflected, and thus a virtual sound imitating a more realistic engine output sound of the internal combustion engine can be provided.

In addition, as described above, in the case where the sound source playback unit 50 further includes the sound source mixing unit 51 and the sound source comparison unit 53, it can perform a comparison and mixing operation on a plurality of sound sources and transfer the compared and mixed sound sources to the control unit 20 or the sound output unit 70. In other words, a plurality of sound sources that are shifting-controlled according to a plurality of frequency bands may be selected to be mixed and outputted by applying a shifting factor calculated for an operating sound formed according to each frequency band using the sound source mixing unit 51.

In addition, although definitely not described in this embodiment, a sound source may be played back through the sound source comparison unit and/or the sound source mixing unit in a fade-out method of gradually decreasing the volume of an operating sound when a vehicle is driven at a speed more than a predetermined speed or a fade-in method of gradually increasing the volume of the operating sound to naturally express the sound source when the vehicle starts in a stopped state. Further, a basic low frequency sound source is formed as a basic operating sound in a method of outputting a sound source of rapid acceleration or sudden braking. In the case of a rapid acceleration driving sound, a sound source expressing a strongly accelerating state is mixed by extending the range of frequency change, and in the case of a sudden braking driving sound, a decelerated state of the vehicle can be expressed by using a sound source which also decreases the volume while moving from a high frequency domain to a low frequency domain as the vehicle speed decreases so that a pedestrian or a driver can recognize a sudden braking state and a rapid acceleration state.

The sound source amplification unit 60 is configured to receive a sound source output from the sound source playback unit 50, generate an energy component larger than the energy component of the sound source output from the sound source playback unit 50 to deliver the sound source to the driver or a pedestrian through the sound output unit 70, and output the sound of a large energy component to the outside.

The sound output unit 70 is a device for outputting an operating sound played back by the sound source playback unit 50, and as shown in FIG. 1, it may be configured of an external output unit 71 for outputting an operating sound to the outside of a vehicle to be delivered to a pedestrian and an internal output unit 73 for outputting an operating sound to the inside of the vehicle to be delivered to the driver. Any one or both of the external output unit 71 and the internal output unit 73 can be selected according to an operating sound being played back and controlled by the control unit 20 to output the operating sound. The external output unit 71 may be mounted to be arranged inside the bonnet of the vehicle to deliver an operating sound related to the current vehicle operation state to a pedestrian positioned in front of or beside the vehicle or the driver, and the internal output unit 73 may be separately mounted inside the vehicle to deliver an operating sound into the interior space of the vehicle to deliver an operating sound related to the current vehicle operation state to the driver.

The control unit 20 receives various sensing signals sensed by the vehicle state sensing unit 10, controls the operation of the sound source playback unit 50 to play back different kinds of operating sounds in different playback methods according to the received sensing signal, and generally controls the operation state of the entire system. At this point, the control unit 20 is configured to receive the sensing signal from the vehicle state sensing unit 10 through a vehicle communication element such as a CAN communication unit (not shown).

According to such a configuration, since the vehicle sound generator apparatus according to an embodiment of the present invention senses various operation states of a vehicle and outputs an operating sound of a form appropriate to a corresponding operation state according thereto in various manners so that the pedestrian can recognize a vehicle state, thereby further securing safety of a pedestrian, and the driver can further correctly recognize the current operation state of the vehicle, thereby maintaining a driving condition of the driver in a more convenient and safe manner.

On the other hand, the vehicle sound generator apparatus according to an embodiment of the present invention may be further provided with a separate operation switch (not shown), and the operation switch (not shown) may be configured to be manipulated by a user to perform an on/off operation. According to an on/off signal of the operation switch, the control unit 20 may control the operation of the sound source playback unit 50 to turn on or off the operation state of the sound source playback unit 50.

That is, the operation switch is configured to enable a user to turn on or off the operation thereof by mounting the operation switch inside the vehicle so that the user can turn on or off the operation of the sound source playback unit 600. For example, if a user desires to enjoy driving in a very calm state, the user may manipulate the operation switch to a turned off state in order not to play back and output an operating sound generated according to a vehicle operation state.

Hereinafter, a control process S1, i.e., an operation process, of the vehicle sound generator apparatus according to an embodiment of the present invention will be described with reference to the drawings. First, a providing step S10 of providing a vehicle sound generator apparatus according to an embodiment of the present invention is executed, and description of the environmentally-friendly vehicle sound generator apparatus is substituted by the above descriptions to avoid duplicated descriptions.

Thereafter, the control unit 20 executes a sensing step S20 of allowing the vehicle state sensing unit 10 to sense information related to a current vehicle state, and receiving the sensed vehicle state information from the vehicle state sensing unit 10. The vehicle state information sensed in the sensing step S20 can be stored in the storage unit 30. The vehicle state information used in this embodiment is a vehicle speed. The control unit 20 and the arithmetic unit 40 executes a shifting factor calculation step S30 of arithmetically calculating a shifting factor (SFp, SFv) corresponding to a current vehicle driving speed using the vehicle speed information sensed by the vehicle speed sensor 13 and the velocity shifting profile stored in the reference data storage unit 35 of the storage unit 30. A reference symbol SFp denotes a shifting factor for a pitch, and a reference symbol SFv denotes a shifting factor for a volume, i.e., a sound pressure.

The shifting factor calculation step S30 includes a speed confirmation step S31, a speed section confirmation step S33, a speed section-corresponding shifting node setting step S35, and a shifting factor calculation step S37.

In the speed confirmation step S31, the control unit 20 confirms the vehicle speed sensed in the sensing step. That is, the control unit 20 confirms a current vehicle speed and a reference data stored in the reference data storage unit 35 by using data information of the vehicle speed that is sensed by the vehicle speed sensor 13 of the vehicle state sensing unit 10 and then stored in the storage unit 30 through the control unit 20.

Thereafter, the control unit 20 executes the speed section confirmation step S33 where the control unit 20 compares the current vehicle driving speed confirmed in the speed confirmation step S33 with information regarding a speed section and confirms a speed section to which the current vehicle driving speed corresponds.

Subsequently, the control unit 20 executes the speed section-corresponding shifting node setting step S35 where the control unit 20 sets a shifting node for a corresponding vehicle speed from a shifting node (nsvp) corresponding to a previous vehicle speed obtained in a previous state, i.e., a previous step and a shifting boundary node (nsv1 or nsvf) for any one section boundary speed of section boundary speeds of the corresponding vehicle speed section sensed in the speed section confirmation step S33. In other words, the control unit 20 sets the previous shifting node (nsvp) and the shifting boundary node (nsv1 or nsvf) for any one of the section boundary speeds of the corresponding vehicle speed section in the speed section-corresponding shifting node setting step S35. The previous shifting node (nsvp) denotes a shifting node obtained with respect to the vehicle speed obtained in the previous step, and the shifting boundary node (nsv1 or nsvf) denotes a shifting node for any one speed of the anterior and posterior speeds (v1, vf) representing section boundaries of a vehicle speed section to which the current vehicle driving speed belongs in a preset vehicle speed section. Herein, whether to select a shifting node for any speed of the section boundary speeds is determined by a vehicle acceleration-based selection method.

In other words, as shown in the drawings, the speed section-corresponding shifting node setting step S35 includes a previous shifting node confirmation step S351, a section boundary shifting node confirmation step S353, and a corresponding vehicle speed shifting node calculation step S355.

In the previous shifting node confirmation step S351, the control unit 20 confirms a shifting node for the previous vehicle speed. In the section boundary shifting node confirmation step S353, the control unit 20 confirms a shifting boundary node (nsv1 or nsvf) for any one section boundary speed (v1 or vf) of the section boundary speeds of the corresponding vehicle speed section. In the corresponding vehicle speed shifting node calculation step S355, the control unit 20 calculates a shifting node (nsv) for a current corresponding vehicle speed from the previous shifting node and the any one section boundary shifting node (nsv1 or nsvf).

In this case, the section boundary shifting node confirmation step S353 can be executed in various manners, but may be executed in a manner shown in the drawings. In other words, the section boundary shifting node confirmation step S353 includes an acceleration confirmation step S3531, an acceleration and deceleration determination step S3535, a posterior section boundary shifting node setting step S3537, and an anterior section boundary shifting node setting step S3539.

First, the control unit 20 executes the acceleration confirmation step S3531 where the control unit 20 confirms an acceleration of a vehicle. In other words, the control unit 20 calculates a current acceleration (at) of the vehicle from a vehicle speed (vt-1) in the previous step and the current vehicle speed (vt), and the calculation method can be used in various manners, such as using a vehicle speed (vt-2) in a previous step so as to prevent frequent fluctuation. In addition, it will be obvious that in the case where a vehicle acceleration sensor is used, a directly sensed acceleration signal can be utilized, if necessary.

Thereafter, the control unit 20 executes the acceleration and deceleration determination step S3535 where the control unit 20 determines whether a current vehicle driving state is an accelerated state (or a constant speed driving state) or a decelerated state using the current acceleration obtained in step S3531. That is, the control unit 20 determines whether the current vehicle acceleration (at) is equal to or smaller than 0.

If the control unit 20 determines in step S3535 that the current acceleration (at) is equal to or larger than 0, the program proceeds to the posterior section boundary shifting node setting step S3537. On the contrary, if the control unit 20 determines in step S3535 that the current acceleration (at) is smaller than 0, the control unit 20 executes the anterior section boundary shifting node setting step S3539. In the posterior section boundary shifting node setting step S3537, the control unit 20 sets the section boundary shifting node as a shifting node for the posterior section boundary speed of the section boundary speeds of the corresponding vehicle speed section after determining that the current acceleration is equal to or larger than 0 in the acceleration and deceleration determination step, i.e., the current vehicle speed state is an accelerated state. In the anterior section boundary shifting node setting step S3539, the control unit 20 sets the section boundary shifting node as a shifting node for the anterior section boundary speed of the section boundary speeds of the corresponding vehicle speed section after determining that the current acceleration is smaller than 0 in the acceleration and deceleration determination step, i.e., the current vehicle speed state is a decelerated state.

In other words, an example of the case where the current vehicle speed state is an accelerated state will be described hereinafter with reference to the drawings. First, in an initial state, i.e., a state where the vehicle is stopped, a shifting node denoted by a reference symbol A can be stored as an initial value in the reference data storage unit 35 of the storage unit 30. Besides, the velocity shifting profile sets the speed sections to 0-10 km/h, 10-20 km/h, 20-30 km/h, and 30-40 km/h, and the shifting boundary nodes for the speed sections are indicated by points ● in the drawings.

First, a description will be described centering on a pitch shifting factor, but the same method is also applied for a sound pressure shifting factor.

A speed section for a vehicle speed (DATA#1) obtained when t=t1 is confirmed, and the section boundary speeds (v1=0 km/h, vf=10 km/h) for a corresponding speed section are confirmed. If t=t0, the vehicle is in a stopped state, and subsequently, it is confirmed that the vehicle is in an accelerated state through the start for the driving, so that the control unit 20 sets a posterior section boundary shifting node B, i.e., a shifting node corresponding to a posterior section boundary speed as a corresponding section boundary shifting node (nsvf), and calculates a shifting node A+1 on a segment that interconnects a shifting node A and the section boundary shifting node B from the section boundary shifting node (nsvf). In other words, the control unit 20 and the arithmetic unit 40 derive the shifting node A+1 when t=t1 through the interpolation. If t=t2, a shifting node A+2 can be set from the shifting node A+1 and the section boundary shifting node B through the same process for a speed section for a vehicle speed (DATA#2) obtained, except that the previous shifting node (A+1) for the previous vehicle speed.

On the other hand, a speed section for a vehicle speed (DATA#3) obtained when t=t3 is confirmed, and the section boundary speeds (v1=10 km/h, vf=20 km/h) for a corresponding speed section are confirmed. If t=t3, the vehicle is in a driving state, and subsequently, it is confirmed that the vehicle is in an accelerated state through the start for the driving, so that the control unit 20 can set a posterior section boundary shifting node C, i.e., a shifting node corresponding to a posterior section boundary speed as a corresponding section boundary shifting node (nsvf), and derive a new shifting node B' on a segment that interconnects the previous shifting node A+2 and the section boundary shifting node C from the section boundary shifting node (nsvf). In other words, A speed section-specific shifting node data is provided without applying a conventional one-to-one mapping method to a vehicle speed, and a new shifting node calculation method is applied from a previous shifting node and a corresponding section boundary shifting node through the interpolation so that the control unit 20 can output a sound close to a real sound through a sound source close to a more realistic sound, on which the control of a pitch or a sound pressure is performed.

In other words, for example, when it is assumed that a period when a vehicle speed is sensed can be received in the unit of about a maximum of 10 ms, in the case where a shifting is performed to follow the shifting nodes stored in the reference data storage unit 35 until the vehicle speed reaches up to 40 km/h, data collection of about a total of 400 times is necessary, which physically needs a time of 4 seconds, and in this embodiment, this is set as a normal state in which a typical driver starts to drive slowly. However, if the time when the driver progresses a rapid acceleration and reaches 40 km/h is shortened to $\frac{1}{10}$ of the normal state, the interval of the speed data is increased and the number of data inputted until the vehicle speed reaches up to 40 km/h is reduced drastically. The present invention takes a method of dividing a speed section to which a corresponding vehicle speed belongs with respect to data inputted, i.e., vehicle speed information, providing shifting nodes such as inflection points corresponding to the divided speed section, and calculating the shifting nodes through the interpolation so as to use a velocity shifting diagram and an operation process that enable the derivation of a shifting diagram varying depending on the vehicle speed, thereby enabling a variable sound pressure and pitch shifting that reflects the rapid acceleration and the sudden braking of the vehicle, but not a simple one-to-one matching shifting diagram, and thus improving the quality of a virtual operating sound that imitates a real engine sound so as to be transferred to a driver and a pedestrian.

Such a shifting factor is calculated, and then the control unit 20 controls a sound pressure or a pitch of a sound source of an operation sound of a frequency band required by the sound source control unit 55 of the sound source playback unit for application to the sound output unit 70 using the shifting factor (SF;SFp, SFv) calculated in the shifting factor calculation step S30 so as to perform a predetermined sound output process so that the pedestrian and/or the driver can recognize a vehicle driving state through awakening the driver's attention.

Such a vehicle sound generator apparatus control method S1 can be applied to both a conventional internal combustion engine vehicle and an environmentally-friendly vehicle such as an electric car or a hybrid vehicle. In other words, as shown in the drawings, the vehicle sound generator apparatus control method S1 may include an internal combustion engine vehicle sound control method SEO for controlling the internal combustion engine vehicle. That is, in the case where the internal combustion engine vehicle forms a driving state, the vehicle sound generator apparatus control method S1 is executed, and then the control unit 20 determines whether or not an RPM sensed by the RPM sensor of the vehicle state sensing unit is equal to or larger than a preset value stored in the storage unit (SE1). If it is determined that the sensed RPM is equal to or larger than the preset value, the control unit 20 determines that the pedestrian can recognize the vehicle speed, and executes a sound control off step (SE2) of stopping the execution of the vehicle sound generator apparatus control method. On the contrary, if it is it is determined that the sensed RPM is smaller than the preset value, the control unit 20 determines that complementation of recognition for the pedestrian is needed, and maintains the execution of the vehicle sound generator apparatus control method S1.

In addition, the vehicle sound generator apparatus control method S1 can be applied to both a conventional internal combustion engine vehicle and an environmentally-friendly vehicle such as an electric car or a hybrid vehicle. The vehicle sound generator apparatus control method S1 may include an environmentally-friendly sound control method SHO for controlling the environmentally-friendly vehicle. In other words, in the case where the environmentally-friendly vehicle forms a driving state, the control unit 20 determines whether an engine mode is an internal combustion engine mode or a battery driving mode (SH1). If it is determined that the engine mode is the battery driving mode, the control unit 20 executes a sound control on step of automatically executing the vehicle sound generator apparatus control method S1. On the contrary, if it is determined that the engine mode is not the battery driving mode, the control unit 20 executes a sound control off step of stopping the execution of the vehicle sound generator apparatus control method S1, and compares a vehicle's transmission gear value, a vehicle speed and a vehicle RPM with the preset values stored in the storage unit. For example, if the transmission gear value is equal to or larger than the preset gear value, the vehicle speed is equal to or larger than 5 km/h, and the RPM is smaller than the preset RPM value, the control unit 20 determines that the environmentally-friendly vehicle travels on a downhill slope and executes the sound control on step of executing the vehicle sound generator apparatus control method S1. On the contrary, if the environmentally-friendly vehicle does not satisfy at least one of the conditions where the transmission gear value is equal to or larger than the preset gear value, the vehicle speed is equal to or larger than 5 km/h, and the RPM is smaller than the preset RPM value, the control unit 20 determines that the environmentally-friendly vehicle does not travels on the downhill slope and allows the control flow to proceed to the sound control off step to induce the off state of the vehicle sound generator apparatus control method S1.

In addition, the vehicle sound generator apparatus control method of the present invention may further include a correction step S50 of correcting the position of a shifting node regularly provided to the velocity shifting profile after the control and output step S40. In other words, in the correction step S50, the control unit 20 can compare a sound output signal outputted in the control and output step S40 with a reference sound output signal stored in the reference data storage unit 35 of the storage unit 30, and control the velocity shifting profile.

The correction step S50 includes an output sensing step S51, an output reference comparison step S53, a conformance determination step S55, and a node position control step S57.

First, in the output sensing step (S51), the control unit 20 senses the sound output signal outputted in the in the control and output step S40, and in the output reference comparison step S53, the control unit 20 compares the sound output signal obtained in the output sensing step with the reference sound output signal.

Thereafter, the control unit 20 executes the conformance determination step S55 where the control unit determines whether or not the sound output signal is in conformance with the standard of the reference sound output signal stored in the reference data storage unit 35. A method of determining whether or not sound output signal is in conformance with the standard of the reference sound output signal can be modified in various manners within a range of comparing a signal applied to the sound output unit with the reference sound output signal and determining the conformance, such as taking a method of converting a sound applied to the sound output unit, calculating a sound pressure/pitch or a sound spectrum of a virtually outputted sound, and comparing a signal indicative of the virtual output sound with the reference sound output signal indicating the best state for allowing the pedestrian to recognize so as to determines the conformance.

Subsequently, the control unit 20 executes the node position control step S57 where if it is determined that the sound output signal is not in conformance with the standard of the reference sound output signal in the conformance determination step S55, the control unit 20 controls, in a preset direction on the velocity shifting profile, the position of the shifting boundary node as a shifting node point allocated to the section boundary speed using a shifting boundary node shift value stored in the storage unit.

For example, if it is determined that the shifting width of the pitch is excessively large, the control unit 20 may downwardly shift, on the velocity shifting profile, the position of the shifting boundary node as a shifting node point allocated to the speed section by a preset width.

It is possible to enable the control of the sound source in a manner suitable for the awakening of a pedestrian's attention through such a correction process.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. In other words, the present invention can be modified in various manners, such as excluding an initialization step within a range of including a process of performing a fade-out function Therefore, the embodiments disclosed herein are provided in order to describe the technical spirit of the present invention, but the scope of the present invention is not limited by the embodiments. The true technical scope of the present invention should be defined by the technical spirit of the appended claims, and all the technical spirits within the scope equivalent thereto should be construed as falling within the scope of the present invention.

What is claimed is:

1. A method for controlling a vehicle sound generator apparatus, the method comprising:
a providing step of providing the vehicle sound generator apparatus, the vehicle sound generator apparatus including: a vehicle state sensing unit for sensing an operation state of a vehicle; a storage unit for storing a plurality of operating sounds that can be output according to the operation state of the vehicle and for storing a velocity shifting profile including a shifting factor that controls a sound pressure or a pitch of each of the operating sounds with respect to a speed of the vehicle; a sound source playback unit for selecting and playing back at least one operating sound from the plurality of operating sounds stored in the storage unit; a sound source amplification unit for amplifying the operating sound played back by the sound source playback unit; a sound output unit for outputting the operating sound amplified by the sound source amplification unit; and a control unit for receiving a sensing signal from the vehicle state sensing unit and controlling the operation of the sound source playback unit so as to play back the operating sound in different playback methods in such a manner as to control and change the operating sound according to the received sensing signal, wherein the control unit calculates a corresponding shifting factor from the velocity shifting profile to correspond to the vehicle speed, and controls and outputs the sound pressure or the pitch of the operating sound,
a sensing step of sensing a speed of the vehicle by the vehicle state sensing unit;
a shifting factor calculation step of calculating the shifting factor corresponding to the vehicle speed from the vehicle speed sensed in the sensing step and the velocity shifting profile stored in the storage unit; and
a control and output step of outputting, through a sound output unit, the operating sound obtained by being subjected to a shifting control according to the vehicle speed from the shifting factor calculated in the shifting factor calculation step,
wherein the velocity shifting profile includes the shifting factor that controls the sound pressure or the pitch of each of the operating sounds with respect to the vehicle speed in such a manner to include a shifting factor of a shifting boundary node for a section boundary speed of a vehicle speed section with the vehicle speed divided by section,
wherein the shifting factor within the vehicle speed section is calculated from a previous shifting node having a shifting factor for the vehicle speed in a previous step on the velocity shifting profile, and a shifting boundary node for any one of anterior and posterior section boundary speeds of a corresponding vehicle speed section,
wherein the shifting factor calculation step comprises;
a speed confirmation step (S31) of confirming the vehicle speed sensed in the sensing step;
a speed section confirmation step (S33) of confirming a corresponding vehicle speed section from the vehicle speed confirmed in the speed confirmation step;
a speed section-corresponding shifting node setting step (S35) of setting a shifting node for a corresponding vehicle speed from a shifting node corresponding to a previous vehicle speed and a shifting boundary node for a posterior section boundary speed of section boundary speeds of the corresponding vehicle speed section sensed in the speed section confirmation step (S33); and
a shifting factor calculation step (S37) of calculating a corresponding shifting factor from the set shifting node for the corresponding vehicle speed,
wherein the speed section-corresponding shifting node setting step (S35) comprises;
a previous shifting node confirmation step (S351) of confirming a shifting node for the previous vehicle speed;
a section boundary shifting node confirmation step (S353) of a shifting boundary node for any one of the section boundary speeds of the corresponding vehicle speed section; and
a corresponding vehicle speed shifting node calculation step (S355) of calculating a shifting node for a current corresponding vehicle speed from the previous shifting node and the any one section boundary shifting node.

2. The method according to claim 1, wherein the section boundary shifting node confirmation step (S353) comprises:
an acceleration confirmation step (S3531) of calculating a current acceleration (at) of the vehicle from a vehicle speed (vt-1) in the previous step and the current vehicle speed (vt);
an acceleration and deceleration determination step (S3535) of determining whether the current vehicle acceleration (at) is equal to or larger than 0; and
a posterior section boundary shifting node setting step (S3537) of setting the section boundary shifting node as a shifting node for the posterior section boundary speed of the section boundary speeds of the corresponding vehicle speed section if it is determined that the current vehicle acceleration is equal to or larger than 0 in the acceleration and deceleration determination step (S3535).

3. The method according to claim 2, wherein the section boundary shifting node confirmation step (S353) further comprises:
an anterior section boundary shifting node setting step (S3539) of setting the section boundary shifting node as a shifting node for the anterior section boundary speed of the section boundary speeds of the corresponding vehicle speed section if it is determined that the current vehicle acceleration is smaller than 0 in the acceleration and deceleration determination step (S3535).

4. A method for controlling a vehicle sound generator apparatus, the method comprising:
a providing step of providing the vehicle sound generator apparatus, the vehicle sound generator apparatus including: a vehicle state sensing unit for sensing an operation state of a vehicle; a storage unit for storing a plurality of operating sounds that can be output according to the operation state of the vehicle and for storing a velocity shifting profile including a shifting factor that controls a sound pressure or a pitch of each of the operating sounds with respect to a speed of the vehicle; a sound source playback unit for selecting and playing back at least one operating sound from the plurality of operating sounds stored in the storage unit; a sound source amplification unit for amplifying the operating sound played back by the sound source playback unit; a sound output unit for outputting the operating sound amplified by the sound source amplification unit; and a control unit for receiving a sensing signal from the vehicle state sensing unit and controlling the operation of the sound source playback unit so as to play back the operating sound in different playback methods in such a manner as to control and change the operating sound according to the received sensing signal, wherein the control unit calculates a corresponding shifting factor from the velocity shifting profile to correspond to the vehicle speed, and controls and outputs the sound pressure or the pitch of the operating sound,
a sensing step of sensing a speed of the vehicle by the vehicle state sensing unit;
a shifting factor calculation step of calculating the shifting factor corresponding to the vehicle speed from the vehicle speed sensed in the sensing step and the velocity shifting profile stored in the storage unit; and
a control and output step of outputting, through a sound output unit, the operating sound obtained by being subjected to a shifting control according to the vehicle speed from the shifting factor calculated in the shifting factor calculation step,
wherein in the case where the vehicle is an internal combustion engine vehicle, the control unit controls the vehicle sound generator apparatus to be turned ON and compares a signal from an RPM sensor included in a vehicle state sensing unit with a preset value stored in the storage unit to control the on/off operation of the vehicle sound generator apparatus if the vehicle speed is equal to or larger than 0 km/h.

5. The method according to claim 1, wherein in the case where the vehicle is a hybrid vehicle, the control unit controls the vehicle sound generator apparatus to be turned ON if the vehicle speed is equal to or larger than 0 km/h and the vehicle mode is not an internal combustion engine mode.

6. The method according to claim 5, wherein the control unit controls the vehicle sound generator apparatus to be turned off if the vehicle speed is equal to or larger than 0 km/h or the vehicle mode is an internal combustion engine mode, and
wherein in the case where a transmission mode from an inhibitor sensor included in the vehicle state sensing unit forms the number of a stage higher than that of a preset transmission mode stored in the storage unit, a speed signal from a vehicle speed sensor included in the vehicle state sensing unit is higher than a preset speed stored in the storage unit, and a signal from the RPM sensor included in the vehicle state sensing unit is smaller than the preset value stored in the storage unit, the control unit determines that the vehicle travels on a downhill slope, and controls the vehicle sound generator apparatus to be turned on.

7. A method for controlling a vehicle sound generator apparatus, the method comprising:
a providing step of providing the vehicle sound generator apparatus, the vehicle sound generator apparatus including: a vehicle state sensing unit for sensing an operation state of a vehicle; a storage unit for storing a plurality of operating sounds that can be output according to the operation state of the vehicle and for storing a velocity shifting profile including a shifting factor that controls a sound pressure or a pitch of each of the operating sounds with respect to a speed of the vehicle; a sound source playback unit for selecting and playing back at least one operating sound from the plurality of operating sounds stored in the storage unit; a sound source amplification unit for amplifying the operating sound played back by the sound source playback unit; a sound output unit for outputting the operating sound amplified by the sound source amplification unit; and a control unit for receiving a sensing signal from the vehicle state sensing unit and controlling the operation of the sound source playback unit so as to play back the operating sound in different playback methods in such a manner as to control and change the operating sound according to the received sensing signal, wherein the control unit calculates a corresponding shifting factor from the velocity shifting profile to correspond to the vehicle speed, and controls and outputs the sound pressure or the pitch of the operating sound, a sensing step of sensing a speed of the vehicle by the vehicle state sensing unit;

a shifting factor calculation step of calculating the shifting factor corresponding to the vehicle speed from the vehicle speed sensed in the sensing step and the velocity shifting profile stored in the storage unit; and a control and output step of outputting, through a sound output unit, the operating sound obtained by being subjected to a shifting control according to the vehicle speed from the shifting factor calculated in the shifting factor calculation step, the method further comprising a correction step (S50) of allowing the control unit to compare a sound output signal outputted in the control and output step with a reference sound output signal stored in the storage unit, and control the velocity shifting profile.

8. The method according to claim 7, wherein the velocity shifting profile includes a shifting factor of a shifting boundary node for a section boundary speed of a vehicle speed section with the vehicle speed divided by section, and wherein the correction step (S50) comprises:

an output sensing step (S51) of sensing the sound output signal outputted in the in the control and output step;

an output reference comparison step (S53) of comparing the sound output signal obtained in the output sensing step with the reference sound output signal;

a conformance determination step (S55) of determining whether or not the sound output signal is in conformance with the standard of the reference sound output signal; and a node position control step (S57) of controlling, on the velocity shifting profile, the position of the shifting boundary node using a shifting boundary node shift value stored in the storage unit.

* * * * *